Oct. 21, 1924.

H. P. KRAFT

RIM NUT OR THE LIKE

Filed Feb. 10, 1923

1,512,896

INVENTOR:
Henry P. Kraft,
By Attorneys,
Fraser, Guick & Myers

Patented Oct. 21, 1924.

1,512,896

UNITED STATES PATENT OFFICE.

HENRY PHILLIP KRAFT, OF RIDGEWOOD, NEW JERSEY; EDGAR J. PHILLIPS AND EARL A. DARR EXECUTORS OF SAID HENRY PHILLIP KRAFT, DECEASED.

RIM NUT OR THE LIKE.

Application filed February 10, 1923. Serial No. 618,201.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Rim Nuts or the like, of which the following is a specification.

This invention relates to nuts, and particularly to those designed for use in connection with pneumatic tire valves for engaging the wheel felloe and drawing the valve casing inwardly to a firm seat. Such nuts are customarily made of sheet metal, and in order to facilitate the operations of drawing and shaping, and also for the purpose of reducing the expense of construction, they are made of the thinnest metal which is capable of standing the strains of use. Each nut customarily carries a leather washer which is received in a recess on its lower side, and projects normally beyond the lower face of the nut, so as to avoid contact of the metal with the wheel felloe. Frequently, the pressure placed upon the washer is sufficient to distort it inwardly so that its opening becomes of less diameter than that of the valve casing. When such a nut is removed and reapplied, the washer hence frequently makes it difficult, if not impossible, to pass the nut over the valve casing.

According to the present invention, I provide a means for preventing the inward distortion of the washer, whereby this difficulty is avoided, such means comprising a thin member of metal or other stiff material entering the hole in the washer. The metal member may be held in position in any suitable way, as by an engaging contact between it and the washer, or between it and the metal of the nut.

The invention also includes other features of improvement which will hereinafter be more fully described.

Referring to the drawings, which illustrate several forms of the invention,—

Figure 1:
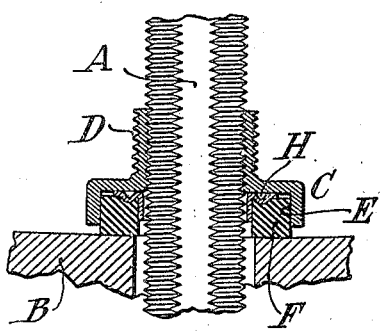
Figure 1 is an elevation of a valve casing, showing the nut in its preferred form in diametrical section.

Referring to the drawings, let A indicate a valve casing or stem which is shown as passing through a wheel felloe B and having thereon a rim nut C, such as provided by the invention. The rim nut C may be a plain nut of hexagonal form, or it may have associated therewith an integral bushing D or may be otherwise shaped, as desired. It is shown as comprising a sheet metal member having a recess E on its lower side, which recess ordinarily conforms in shape to the exterior of the nut. Within the recess E is located a washer F which is customarily made of leather; or other compositions may be used.

The washer F is of such thickness as to project below the lower face of the nut to a considerable extent, it being intended that the nut shall transmit its clamping action through the washer, and shall not itself engage the wheel felloe. The function performed by the rim nut is largely that of pulling the valve casing inwardly, thus bringing the spreader or bridge washer carried by the valve into forcible engagement with the beads of the tire shoe or casing, whereby to prevent circumferential creeping of the latter. Considerable force is thus exerted by the nut and a correspondingly severe compression is put upon the washer. As the washer is usually protected on three sides against spreading, its tendency is to distort inwardly against the valve casing, and when the nut is removed, its expansion is generally in the same direction, so that when it is attempted to reapply the nut, it frequently happens that the hole through the washer has become too small for a ready application.

Figure 4:
Fig. 4 is a diametrical section of a modification of the washer and protecting member.

According to the present invention I limit the possibility of internal expansion by introducing preferably a metal member in the form of a sleeve or bushing into the interior of the washer. The simplest form is that indicated in Fig. 4, wherein the washer F' is provided with a sleeve G', which may be held in by strong frictional contact, or cement, or otherwise.

Figure 3:
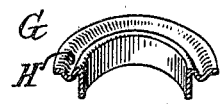
Fig. 3 is a section of the protecting member.
Figure 2:
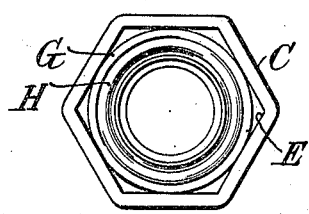
Fig. 2 is an under-side view of the nut.

It is also true that the material of which such washers are preferably made, namely, leather, is difficult to obtain in requisite thickness, and it has heretofore been proposed to introduce into the cavity of the nut a filling piece so as to accommodate the nut to commercial or obtainable thicknesses of leather. Conveniently, according to the present invention, the protecting member G (Fig. 3) may be provided with a flange which is interposed between the upper face of the washer and the nut, thus acting to the extent of its thickness to introduce a filling, and the flange also serving as the means for attachment of the protecting member to the nut. It will ordinarily be sufficient that the flange be forced in the cavity of the nut, so that it has a tight frictional grip upon the flats of the nut as shown in Fig. 2, although other means may be employed if desired to fasten the protecting member, either alone or through the flange, to the nut. Furthermore, if it is desired to still further increase the effectiveness of the flange as a filling piece, the flange may be provided with a projecting ring formed by bending the metal, such ring being indicated in Figs. 1, 2 and 3 by the reference letter H. In these figures the device provided by the invention acts in a double capacity as a filling piece and protecting element for the washer, while at the same time securing an adequate connection between the protecting element and the nut.

In case the washer is made of rubber or other composition, it is quite feasible to vulcanize the protecting element on the interior surface of the washer hole or close to the surface thereof. In any event, the protecting element may advantageously be somewhat shorter than the thickness of the washer, so that the protecting element does not strike the felloe of the wheel, and the necessary contraction of the washer under pressure is not interfered with. The washer may, however, be made co-extensive with the thickness of the nut, in which case if the valve hole through the felloe is not sufficient to accommodate it, it will merely make a slight indentation in the wood of which the felloe is usually constructed.

While I have shown and described several forms of the invention, it will be understood that I do not wish to be limited thereto, as various changes may be made therein without departing from the spirit of the invention.

What I claim is:—

1. A rim nut or the like, having a compressible washer on its under side and having an unthreaded protecting member of larger diameter than the screwthreads of the nut arranged in the hole of the latter to oppose inward distortion of the washer, whereby to avoid interference with the threads of a valve casing over which the rim nut is adapted to be threaded.

2. A rim nut or the like, having a compressible washer on its under side, and a protecting member arranged within the hole of the latter, and having a flange within the interior walls of the nut for connecting the protecting member with the nut.

3. A rim nut or the like, having a compressible washer on its under side, and a protecting member arranged within the hole of the latter, and having a flange engaging the interior walls of the nut to connect the protecting member with the nut, and said flange constituting a filling element within the cavity of the nut.

4. A rim nut or the like, having a compressible washer on its under side, and a protecting member arranged within the hole of the latter, and having a flange engaging the interior walls of the nut to connect the protecting member with the nut, and said flange constituting a filling member within the cavity of the nut, and being provided with a depressed portion to increase the effective thickness of the filling piece.

5. A rim nut or the like, comprising a sheet metal member having a cavity on its under side, a metal member having a flange contacting with said nut within said cavity, and having a depending unthreaded protecting member extended axially of the nut, and a compressible washer arranged within the cavity of the nut and surrounding said protecting member.

6. A rim nut or the like, having a compressible washer and having an unthreaded protecting member arranged in the hole of the latter to oppose inward distortion of the washer, whereby to avoid interference with the threads of the valve casing, and the protecting member having a flange overlying the washer to hold the protecting member in place.

In witness whereof, I have hereunto signed my name.

HENRY PHILLIP KRAFT.